United States Patent
Jabara

(10) Patent No.: US 12,413,612 B2
(45) Date of Patent: Sep. 9, 2025

(54) SECURITY IDENTIFICATION COMPLIANCY SYSTEM

(71) Applicant: IOXT, LLC, Costa Mesa, CA (US)

(72) Inventor: Gary B. Jabara, Newport Beach, CA (US)

(73) Assignee: IOXT, LLC, Costa Mesa, CA (US)

( * ) Notice: Subject to any disclaimer, the term of this patent is extended or adjusted under 35 U.S.C. 154(b) by 147 days.

(21) Appl. No.: 18/381,135

(22) Filed: Oct. 17, 2023

(65) Prior Publication Data
US 2024/0129330 A1 Apr. 18, 2024

Related U.S. Application Data

(60) Provisional application No. 63/416,810, filed on Oct. 17, 2022.

(51) Int. Cl.
*H04L 9/40* (2022.01)
(52) U.S. Cl.
CPC .......... *H04L 63/1433* (2013.01); *H04L 63/20* (2013.01)
(58) Field of Classification Search
None
See application file for complete search history.

(56) References Cited

U.S. PATENT DOCUMENTS

| | | |
|---|---|---|
| 2004/0193907 A1 | 9/2004 | Patanella |
| 2008/0016565 A1 | 1/2008 | Mushing |
| 2012/0197582 A1 | 8/2012 | Richardson |
| 2018/0144123 A1* | 5/2018 | Levin .................... G06F 21/566 |
| 2019/0075081 A1 | 3/2019 | Adam et al. |
| 2020/0233794 A1 | 7/2020 | Smith et al. |

OTHER PUBLICATIONS

International Search Report and Written Opinion of the International Searching Authority, Jan. 30, 2024, filed under PCT/US2023/035345, 10 pages.

* cited by examiner

*Primary Examiner* — Cai Y Chen
(74) *Attorney, Agent, or Firm* — Davis Wright Tremaine LLP; Heather M. Colburn

(57) ABSTRACT

The present invention relates to a security profile identification system that compares security profiles created by standards associations which are derived from pledges and pledge profiles created by a level identification system that are also derived from pledges. The security profile identification system is smartly configured to compare the security profiles to related pledge profiles to determine product compliancy to the security profile.

20 Claims, 6 Drawing Sheets

SECURITY IDENTIFICATION COMPLIANCY SYSTEM

This application claims the benefit of and priority to U.S. Provisional Application No. 63/416,810 filed Oct. 17, 2022, the contents of which are incorporated herein by reference.

FIELD OF DISCLOSURE

The present invention relates to a security identification compliancy system that compares security profiles created by standards associations which are derived from pledges and pledge profiles created by a level identification system that are also derived from pledges. The security profile identification system is configured to compare the security profiles to related pledge profiles to determine product compliancy to the security profile.

BACKGROUND AND SUMMARY

In order to ensure consumer safety, electronic product manufacturers must provide electronic product that meet explicit standards. Such standards are generally developed by a non-profit or government sponsored standards association, established to ensure that electronic products that are made available to the public, are safe. Electronic product manufactures utilize third party testing labs that test the electronic product to ensure compliance to a specific standard. If a testing lab has found, through testing that an electronic product manufacture's electronic product has met the specific standard the electronic product manufacture is provided with a certification by the standard association confirming compliance to that specific standard.

The standards that are developed by a standards association consists of a detailed set of rigid criteria that the electronic product must meet obtain a certificate of compliance. More importantly, the standard often includes the method in how the tests are performed to ensure they meet the criteria defined in the standard. Although the standard enables clear communication between the standards association and the third-party testing lab, their specificity and rigidity do not allow for testing variations that could cause vulnerability when testing for security or interoperability with other electronic products. One example that highlights the rigidity of testing standards relates a standard developed for testing the potential vulnerability of a breach of an electronic product enabled to communicate with other electronic products. The standard will identify the criteria in which the two electronic products may securely communicate and even identify certain security protocols. The testing standard also identifies how the testing lab should test the electronic products to ensure they meet the standard. Although testing standards provide a great place to begin vulnerability testing, their rigidity restricts their ability to provide opportunistic testing. This is further compounded by the defined resources available at the testing labs which employ strict procedures, defined testing facilities, and standards testing personnel who are deeply educated in a specific standard which further departs from opportunistic testing.

Ecosystem providers enable electronic products to dynamically communicate to a broader array of other electronic products, animals, and people. For example, an ecosystem provider enables an electronic product such as an electronic electrical switch to communicate with an electronic thermostat, and an electronic speaker such that when the electronic electrical switch is manually turned on the change in status is communicated to the electronical thermostat enabling the electronic thermostat to adjust to a pre-defined temperature, the change of status is communicated through the ecosystem provided by the ecosystem provider to the electronic speaker enabling verbal confirmation that the thermostat adjusted to a predefined temperature, to a person.

Providing an ecosystem that enables electronic products to communicate to other electronic products which may not have been contemplated by any one electronic product provider yields variabilities that are also not often contemplated. For example, when an electronic product is establishing a secure connection with an ecosystem, there is an exposure of passwords or a hand off between protocols so that an otherwise secure connection has a small window of vulnerability that can be completely compromised. Another example of a potential vulnerability can occur when the power of an electronic product is repetitively cycled thereby inducing the product to temporarily behave outside the intended functionality, potentially exposing additional vulnerabilities, and further requiring the need for opportunistic testing.

Opportunistic testing is not rooted in rigorous standards, nor defined testing facilities, nor testing personnel deeply educated in a specific standard. Opportunistic testing is a testing methodology that seeks to find vulnerability to exploit conditions, often security vulnerabilities, that may be temporary or transitional or outside of the consideration by the electronic product manufactures or standard associations. Additionally, it requires testing personnel that have a variety of testing methodologies and skillsets that consider a broader range of opportunistic testing scenarios. The broadening range of opportunistic testing scenarios are meant to creatively seek out vulnerabilities. Some examples of opportunistic testing scenarios can include code planting, whereby unintended code is stored on an electronic product, and port snooping, whereby an electronic product's open virtual ports are identified and used, and social engineering, whereby end users unwittingly provide confidential information. Opportunity testers evolve their opportunity testing scenarios and will often use a variation of opportunity testing scenarios to creatively identify a vulnerability. Opportunity testers often do not wish to disclose their opportunity testing scenarios to other opportunity testers or to the general public and they often wish to remain anonymous to the product manufactures and the ecosystem providers.

In addition, one of the additional challenges relates to an electronic product having a vulnerability within an ecosystem can cause the entire ecosystem to be vulnerable. As electronic product manufactures provide more electronic products or update existing electronic products increases the need for continuous testing as products are added. The ecosystem providers are thereby challenged with the large number of electronic products that constantly being added or updated to work within their ecosystem. In other words, there is a need for a real-time security profile identification system that is configured to compare the security profiles to related pledge profiles for any electronic products that are being added or updated within a certain ecosystem in order to determine such product compliancy to the security profile.

The present invention overcomes the disadvantages described above by providing a dynamic testing platform that enables standards testing, opportunistic testing, and continuous testing while providing real-time security identification compliancy via comparing security profiles created by standards associations which are derived from pledges and pledge profiles created by a level identification system that are also derived from pledges. The apparatus, system and method of the security identification compliance disclosed herein comprises a dynamic testing platform configured to enable anonymous reporting of vulnerabilities by a plurality of testers such as opportunistic testers, vulnerabilities found by standards testing, and continuous testing resources that are required as additional electronic products are added to an ecosystem.

Additionally, the present invention provides communication modules that store predetermined communication protocols that are directly related to a specific electronic product manufacturer or an ecosystem provider. The additional of communication modules with stored predetermined communication protocols, among other important attributes of the present invention, can provide further utility via storing within the communication protocols information related to parameters—for example, the time period within which the specific electronic provider is allowed before a report of a vulnerability is to be provided to upstream electronic product manufacturers and/or other ecosystem providers. The availability of such time period is meant to further enable the electronic product manufacturer to address the vulnerability and its severity before it affects the entire ecosystem of the product.

The present invention also provides a testing platform for opportunistic testing results. More specifically, the opportunistic testing platform provides opportunistic testing personnel with the ability to communicate their testing results and vulnerabilities while remaining anonymous to other opportunistic testing personal, standards testing personnel, product manufacturers, and ecosystem providers. Another important feature of the present invention relates to the security management system where the management system includes a pledge profile. The pledge profile is created by the product manufacturer or ecosystem provider and can comprise of multiple dimensions capable of evolving alongside developing products, ecosystems, and threats.

Additional features and advantages of the invention will become apparent to those skilled in the art upon consideration of the following detailed description of the illustrated embodiment exemplifying the modes of carrying out the invention as presently perceived.

BRIEF DESCRIPTION OF THE DRAWINGS

In the accompanying drawings which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION OF THE DISCLOSURE

Figure 1:
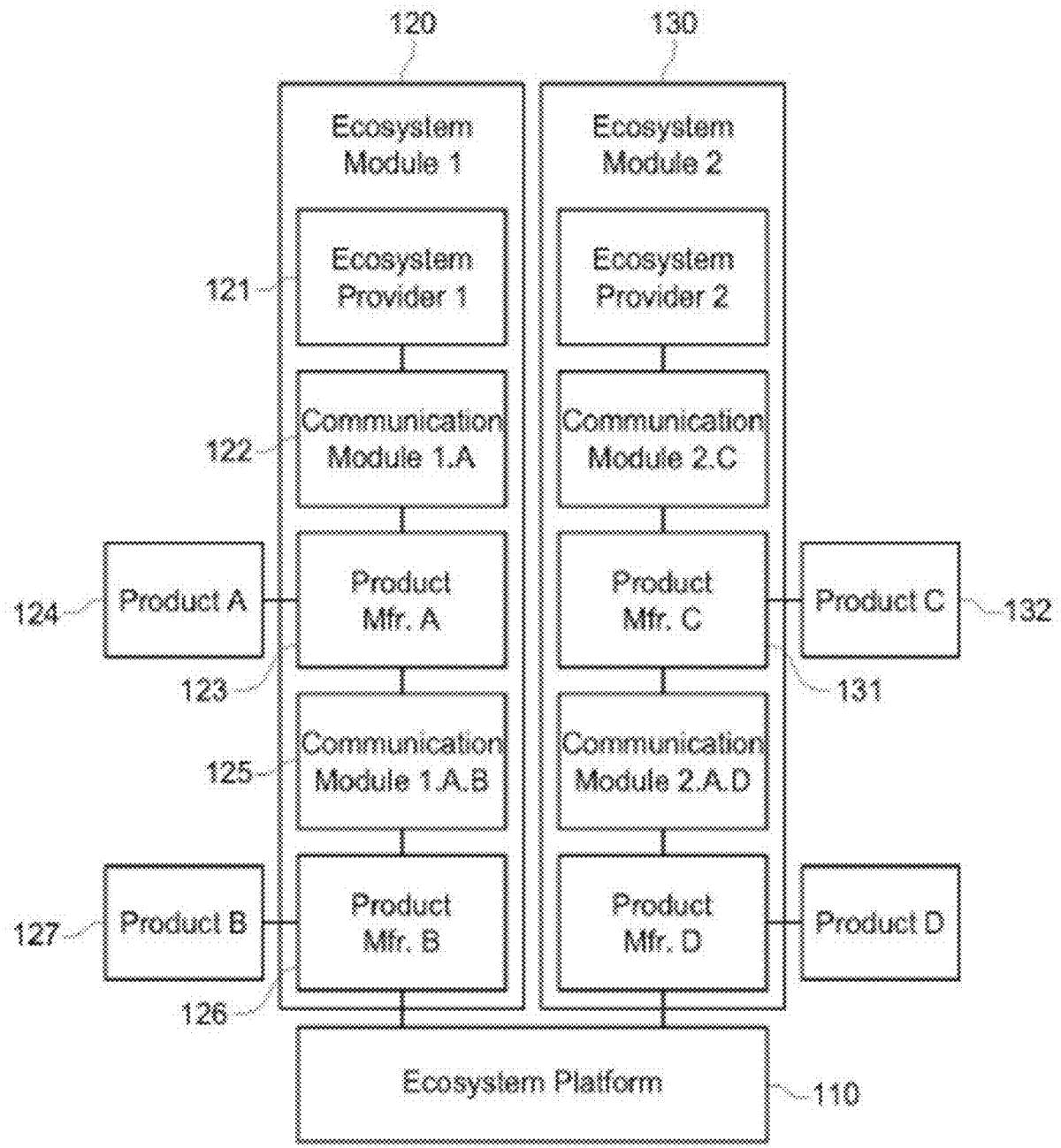
FIG. 1 illustrates an ecosystem platform in accordance with one or more aspects of the present disclosure.

The following detailed description is merely exemplary in nature and is not intended to limit the invention or the application and uses of the invention. Furthermore, there is no intention to be bound by any expressed or implied theory presented in the preceding technical field, background, summary or the following detailed description. A portion of the invention may be described herein in terms of steps. It should be appreciated that such steps may be realized by alternative order.

The present disclosure is directed to an apparatus, method and system comprising a memory having stored computer executable instructions and a processor configured to execute the computer executable instructions stored in the memory. As disclosed, the apparatus, system and method comprises determining a compliance profile comprising a defined set of attribute values for a device associated with a provider within an ecosystem module associated with such provider. The apparatus, system and method is configured to determine a compliance policy that applies to the device associated with the provider within the ecosystem module based on an operating environment and a profile associated with the one device. As disclosed herein, a compliance policy may include data received from an entity connected and associated with the compliance rule for the device associated with the provider. The apparatus, system and method may be further configured to scan the device for an indication of any non-compliance with the compliance rules associated with the compliance policy associated with the device or the ecosystem and determine at least one compliancy level of the device. In response to the indication of the at least one device being non-compliant, the system is configured to (1) generate a vulnerability report for the at least one device; (2) communicate the vulnerability report to the at least one device in order to remedy the violation of the at least one device; and (3) automatically elevate and share the vulnerability report with the at least one provider and/or an upstream supplier associated with the at least one provider if the vulnerability is not addressed and remedied by the at least one device within a certain pre-determined time period.

The apparatus, system and method further comprise a dynamic testing platform having a mediation module communicatively connected to a testing module and an ecosystem platform associated with the device. The ecosystem platform comprises the at least one ecosystem module. The dynamic testing platform is further configured and enabled with anonymous reporting of any violation of the compliance rule associated with the compliance policy of the device within the at least one ecosystem module. The overall purpose of the dynamic testing platform of the present invention is to provide standards testing, opportunistic testing, and continuous testing resources while enabling communication relating to vulnerabilities from opportunistic testers to remain anonymous to electronic product providers while also enabling predefined ecosystem communication relating to vulnerabilities and the status of addressing such vulnerabilities.

An ecosystem platform (110) is represented in FIG. 1, the ecosystem platform includes an ecosystem module 1 (120), associated with a specific ecosystem provider 1 (121). The ecosystem module 1 (120) further includes electronic product manufactures with electronic products represented as electronic product manufacture A (123) with electronic product A (124) and electronic product manufacture B (126) with electronic product B (127). The ecosystem module further includes a communication module 1.A (122) that relates to electronic product manufacture A (123) and communication module 1.A.B (125) which relates to electronic product manufacture B (127). The communication modules store predefined communication rules, for reporting a vulnerability within an ecosystem. These predefined communication rules depict the communication method and timing based on data included within a vulnerability report such as vulnerability type and vulnerability severity. In practice, when a vulnerability is to be communicated to an electronic product manufacture B (126) for product B (127) the associated communication module 1.A.B (125) will receive the vulnerability via a vulnerability report as entered by a tester on the testing platform (FIG. 2; 250), and will define, depending on the vulnerability type and the severity of the vulnerability, the number of days the electronic product manufacture B (126) has to address the vulnerability before it is shared with an upstream supplier such as electronic product manufacture A (123) and ecosystem provider 1 (121). Ecosystem module 2 (130) can reside on the same ecosystem platform (110) and includes a similar structure to ecosystem module 1 (120). Additionally, electronic product manufacture C (131) with electronic product C (132) within ecosystem module 2 (130) can be the same entity as electronic product manufacture A (123) within ecosystem module 1 (120). Ecosystem modules are directly tied to a single ecosystem provider yet can contain additional sub-ecosystems created by a different ecosystem entity and there is no limit to the number of ecosystem modules contained within the ecosystem platform (110).

Figure 2:
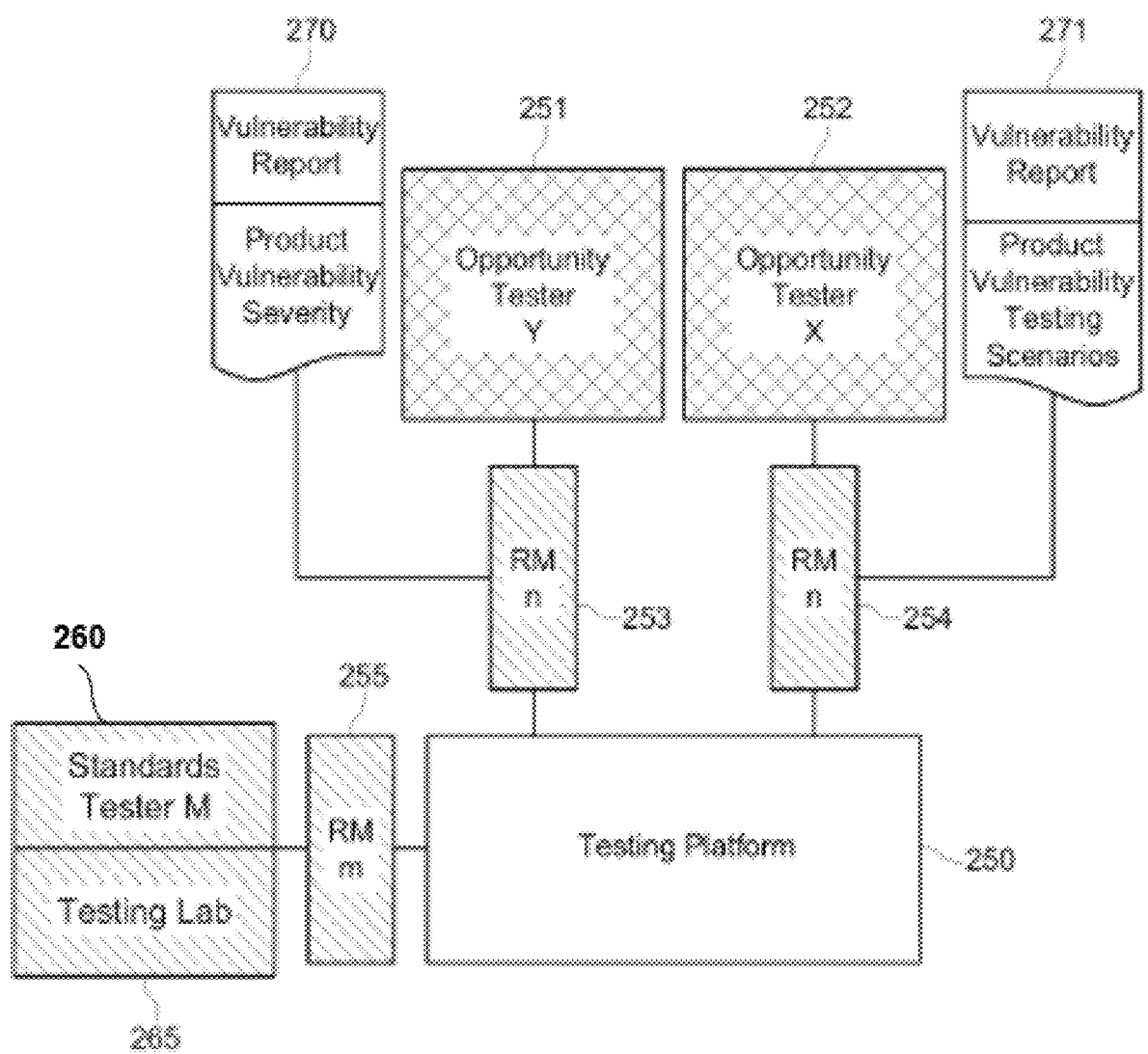
FIG. 2 illustrates a testing platform in accordance with one or more aspects of the present disclosure.

A testing platform (250) is represented in FIG. 2, where the testing platform (250) supports communication from opportunity testers, standards testers, and testing labs. In practice, an opportunity tester Y (251) may perform opportunity testing on an electronic product A (FIG. 1; 123) within an ecosystem provided by ecosystem provider 1 (FIG. 1; 121) and through such opportunity testing identify a vulnerability. Report module N (253) provides the opportunity tester Y (251) with a method of communicating the vulnerability to the testing platform (250). More importantly, the report module N (253) includes a vulnerability report (270) which captures critical data relating to the vulnerability (i.e. electronic product manufacturer name, product number, firmware version, severity level, etc.) but does not capture the identity of the Opportunity Tester Y (251).

The testing platform provides multiple opportunity testers as represented in FIG. 2 where opportunity tester X (252) may also report a vulnerability via the report module N (254). Opportunity tester X (252) may choose to provide their identity in the event the entity providing the testing platform does not disclose opportunity tester X's (252) identity to other opportunity testers, electronic product manufactures, nor ecosystem providers. Additionally, Opportunity Tester X (252) may also provide opportunity testing scenarios within their vulnerability report (271) within the report module N (254).

Providing Opportunity Testers with a structure to report vulnerabilities enables opportunity tests to occur without limitations such as schedule constraints, strict standards, or required testing on specific product types. Relieving these constraints and providing the testing platform for reporting enables continuous testing of electronic products and their interoperability within an ecosystem.

As standards organizations continue to evolve, interoperability standards between electronic products and ecosystems will be created and further refined. Some of these standards will include testing certain vulnerabilities to ecosystems. The standards report module (255) enables a Standards Tester M (260) and a Testing Lab (265) with the ability to report such vulnerabilities as governed by their vulnerability standards via the standards report module M (255).

Figure 3:
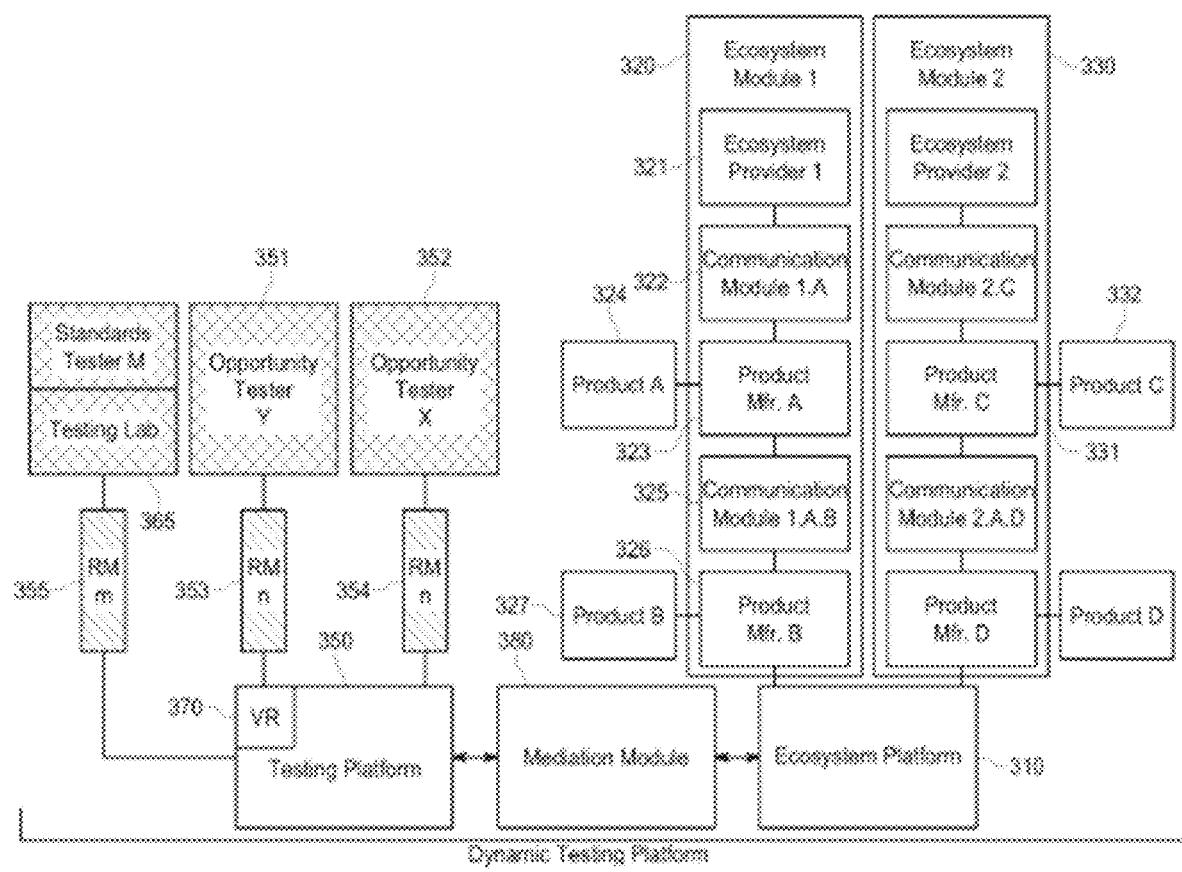
FIG. 3 illustrates a broadened security platform in accordance with one or more aspects of the present disclosure.

A mediation module (380) as represented in FIG. 3, provides a communications/reporting conduit between the testing platform (350) and the ecosystem platform (310). The mediation module (380) enabling vulnerability reports (370) to be distributed to the ecosystem platform (310) and the appropriate electronic product manufacturer. In practice, the mediation module (380) provides the provider of the dynamic testing platform with the ability to verify the accuracy of a vulnerability report (370) prior to providing the vulnerability report to an electronic product manufacturer within the ecosystem platform (310). [HOW does it provide the ability to verify the accuracy of a vulnerability report?]

Figure 4:
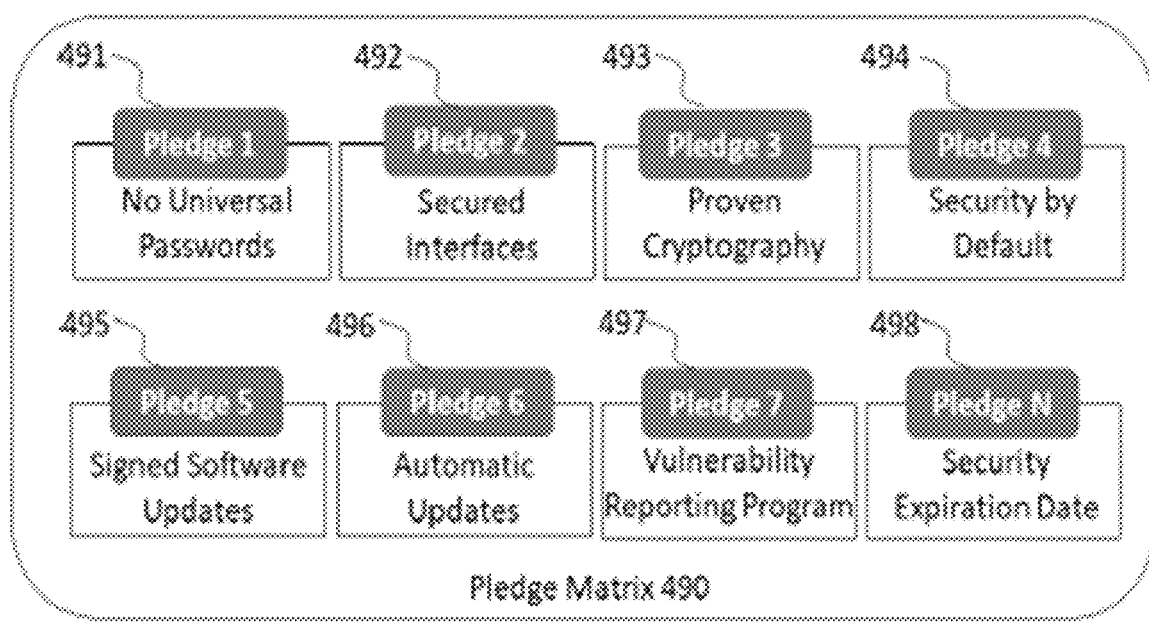
FIG. 4, illustrates a pledge matrix in accordance with one or more aspects of the present disclosure.

As represented in FIG. 4, the pledges may be confirmation of security functionality potentially available within a product. A security profile which is created by a standards association or an ecosystem provider includes a minimum definition of pledges and levels for a specific product and that product's intended function. As an example, pledge 1 (491) identifies a rule within the security profile that states that no universal passwords should be used in the product and that a unique security credential will be required for operation of the product. A specific security profile for an electronic light bulb may require that the electronic light bulb should comply with pledge 1 (491) and this compliance would be measured as level 1 within the security profile.

As further illustrated in FIG. 4, each pledge includes a confirmation of security functionality required by the security profile as defined by the levels. Pledge 2 (492) relates to a product having a secured interface. An interface is where two pieces of hardware or software communicate. In this pledge, all sensitive interfaces shall be encrypted and authenticated. The third pledge (493) relates to the cryptography used to secure communications and data. Specifically, suitable cryptographic security techniques and algorithms that are well developed, proven, reviewed and standardized and should be applied wherever possible in place of proprietary developed algorithms, which haven't been subjected to the same level of scrutiny and review. Pledge 4 (494) relates to security by default, whereby the manufacturer has set a device with an appropriate amount of security protection. An example, a phone may establish a protection feature that disables installation of software by an untrusted third party. The user may turn this feature off enabling installation of software by a third party yet by default the restriction is turned on providing a default level of security, as expected by a user. A product manufacturer providing automated software updates is reflected in pledge 6 (496). Pledge 7 (497) relates to the product manufacturer having a vulnerability reporting program. The vulnerability reporting program shall include a public point of contact to receive and act upon reports of vulnerabilities with the product or service. Pledge N relates to product manufacturers providing consumers with a security expiration date. A security expiration date which is the data the product manufacture will end of life the support of the product and mores specifically product software updates. Additional pledges may be added as needed or required by ecosystem providers, governmental agencies, or consumer preferences.

Another functional part of the security identification compliancy system relates to the measurement of how a product complies with a pledge. A security profile, as represented in FIG. 5, incorporates a level identification system based on the level of conformity required by the standard association or the ecosystem providers.

Figure 6:
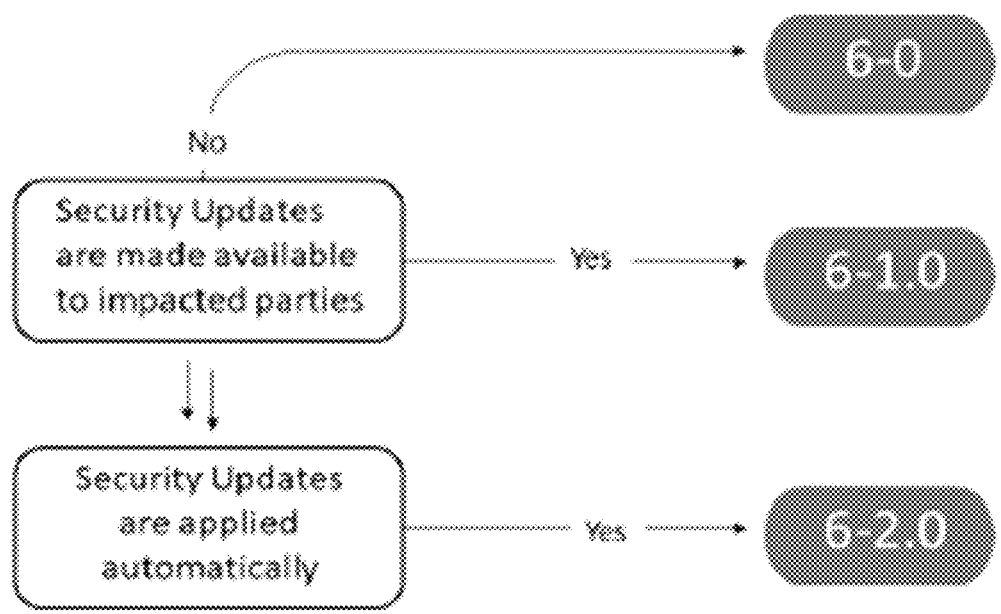
FIG. 6 illustrates the level identification system in accordance with one or more aspects of the present disclosure.

In use, and as represented in FIG. 6, a level identification system that enables the identification of the level in which the product complies with by providing an interface for a product manufacturer to upload information relating to the product including product specifications, testing results, and product functionality. As it relates to the pledges, the level identification system will require the product manufacture to confirm information relating to each pledge. For example, as it relates to pledge 6 (680) illustrated in FIG. 4, the level identification system would require the product manufacturer to confirm whether or not the product will include software updates. If the product manufacturer's answers confirm that the product will not include software updates, the level for pledge 6 would remain zero.

Figure 5:
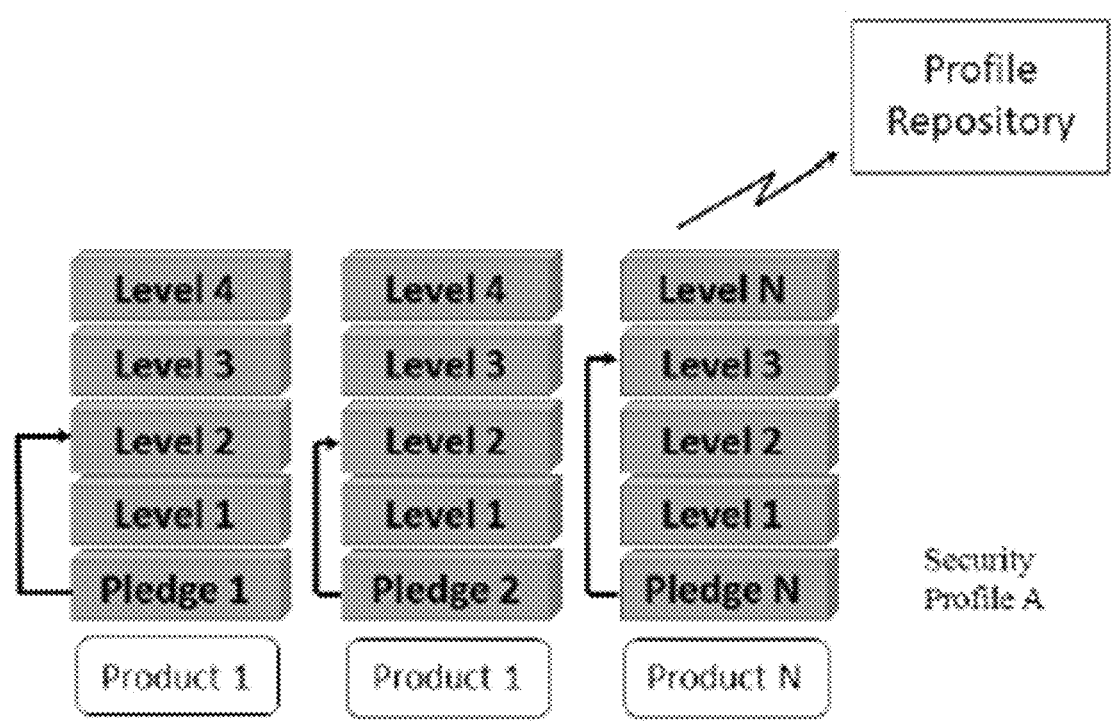
FIG. 5 illustrates a pledge profile in accordance with one or more aspects of the present disclosure.

It is to be noted that, if the product manufacturer confirms that the product will include software updates, then the level identification system will increase the numerical level for this product by one which equates to level 1 as represented in FIG. 5. The level identification system will continue to require additional information from the product manufacture. As illustrated, in this example, for pledge 6 (680), the other levels might be defined to reflect other commitments to update software. For instance, there might be an annual software update commitment and/or a commitment to update the software within 48 hours of the public identification of a security vulnerability. As illustrated in FIG. 6, the product manufacture may be asked to confirm if updates are applied automatically (683). If the product manufacture confirms that the security updates are applied automatically, then the level identification system will increase the numerical level for this product by one which also equates to an additional level (level 2) as represented in FIG. 5. As illustrated in FIG. 6, the level identification system and will continue to require additional information for this pledge or will continue to the next pledge. Upon completion of providing all the information required, the product is provided with a pledge profile which is a representation of which levels the product meets for each pledge. As represented in FIG. 4, the current example provides eight pledges, but the number of pledges and levels can be increased or decreased to provide a product pledge profile.

The standards association has predetermined security profiles which are minimum levels required for each pledge to meet a security standard based on the product type. An example as represented in FIG. 5, security profile A includes three pledges for Product A, Pledge 1, Pledge 2, and Pledge N where Pledge N can represent any additional number of pledges. In this example, Product A must meet a minimum of Level 2 for Pledge 1 and a minimum of Level 2 for Pledge 2, and a minimum of Level 3 for Pledge N to meet the requirement of security profile A. The security profile can then be stored in a repository for recall and comparison to a product pledge profile.

Once the level identification system has retained all the information from the product manufacture, the level identification system will assign a product pledge profile for that specific product. The product pledge profile is a report of levels related to each pledge that the product has meet.

Once a product pledge profile is created for a specific product type, a security identification compliance system will then identify the appropriate security profile based on the product and functionality. The security identification compliance system will then compare the product security profile with the product pledge profile to identify if the product pledge profile meets or exceeds the related levels of the product security file, thereby meeting the pledge standard. The security identification compliance system will then provide a report of compliancy.

The apparatus, system and methods disclosed herein can be used for various networks, including networks of Internet-of-Things (IOT) devices that may include commercial and home automation devices, such as water distribution systems, electric power distribution systems, pipeline control systems, plant control systems, light switches, thermostats, locks, cameras, alarms, motion sensors, and the like. Such IOT devices can be configured with the novel security identification compliance system disclosed herein and may be accessible through remote computers, servers, and other systems, for example, to control systems or access data.

The apparatus, system and methods disclosed herein can be used for any future growth of the Internet and like networks may involve very large numbers of IoT devices. Any number of network protocols and communications standards may be used, wherein each protocol and standard is designed to address specific objectives.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

It is to be noted that while particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

The invention claimed is:

1. A system, comprising:
   a memory having stored computer executable instructions;
   a processor configured to execute the computer executable instructions stored in the memory, the system configured to:
   determine a compliance profile comprising a defined set of attribute values for at least one device associated with at least one provider within at least one ecosystem module;
   determine at least one compliance policy that applies to the at least one device based on an operating environment and the compliance profile associated with the at least one device;
   wherein the at least one compliance policy, having at least one data incorporating at least one compliance rule, received from an entity connected and associated with at least one compliance rule for the at least one device;
   based on the at least one data, scan the at least one device for an indication of any non-compliance with the at least one compliance rule associated with the at least one compliance policy of the at least one device;
   wherein in response to the indication of the at least one device being non-compliant generate a vulnerability report for the at least one device;
   communicate the vulnerability report to the at least one device in order to remedy the violation of the at least one device; and
   automatically elevate and share the vulnerability report with the at least one provider and/or an upstream supplier associated with the at least one provider if the vulnerability is not addressed and remedied by the at least one device within a certain pre-determined time period.

2. The system of claim 1, wherein the system is a dynamic testing platform having at least one mediation module communicatively connected to at least one testing module and at least one ecosystem platform associated with the device;
   wherein the at least one testing module further comprises at least one opportunity testing module connected to at least one standards testing module and at least one continuous testing module;
   wherein the at least one ecosystem platform comprises the at least one ecosystem module; and
   wherein the dynamic testing platform is further configured and enabled with anonymous reporting of any violation of the at least one compliance rule associated with the at least one compliance policy of the at least one device.

3. The system of claim 2, wherein the at least one opportunity testing module is configured to:
   (a) perform opportunity testing to identify any vulnerability associated with any non-compliance of the at least one device;
   (b) capture and store at least one data related to such vulnerability associated with the non-compliance of the at least one device;
   (c) communicate the at least one data related to the vulnerability of the at least one device via the vulnerability report to a mediation module communicatively connected to the testing module and the at least one ecosystem platform, the opportunity testing module further configured to keep any identification information related to any opportunity tester confidential within the vulnerability report; and
   (d) automatically elevate and share the vulnerability report with the at least one provider and/or an upstream supplier associated with the at least one provider if the vulnerability is not addressed and remedied by the at least one device within a certain pre-determined time period.

4. The system of claim 3, wherein the pre-determined time period is the number of days available to the at least one device has in order to address and remedy any violation and the associated vulnerability of the at least one device before the vulnerability report is automatically elevated and shared with the at least one provider and/or an upstream supplier associated with the at least one provider.

5. The system of claim 1, wherein the at least one ecosystem module comprises the at least one device connected to at least one communication module configured and enabled for the anonymous reporting of the vulnerability report to the at least one device and/or to the at least one provider connected to the communications module; and
   wherein the at least one communication module is configured to store a set of pre-defined communication protocols in order to generate and transmit the vulnerability report to the at least one provider and/or the upstream supplier associated with the at least one provider.

6. The system of claim 5, wherein the set of pre-defined communication protocols comprises instructions for communication method and timing of the vulnerability report based on the data included within the vulnerability report.

7. The system of claim 6, wherein the data comprises of the type of vulnerability and the severity of the vulnerability of the at least one device.

8. The system of claim 6, wherein the timing comprises the number of days available to the at least one device to address and remedy the violation based on the vulnerability report before the vulnerability report is automatically elevated and shared with the at least one provider and/or an upstream supplier associated with the at least one provider.

9. The system of claim 1, wherein the entity is a standard setting organization (SSO) belonging to an industry standards setting association related to the at least one provider within the at least one ecosystem module;
   the at least one compliance policy is a security identification compliance policy for the at least one device; and
   wherein the security identification compliance policy compares a security functionality within the at least one device with a security profile created by the SSO or the at least one provider associated with the at least one device.

10. The system of claim 1, wherein the at least one data is the data associated with the security identification compliance policy for the at least one device and wherein the at least one compliance rule associated with the security identification compliance policy related to the at least one device is stored within a database of the SSO related to the at least one provider associated with the at least one device.

11. The system of claim 1, wherein the violation of the at least one device is a security vulnerability of the at least one device associated with the at least one provider within the at least one ecosystem module.

12. The system of claim 1, wherein the vulnerability report includes at least one identification information for the at least one device and/or the at least one provider but do not include any identification information related to any opportunity testing module.

13. The system of claim 2, wherein the at least one mediation module is configured to provide the at least one dynamic testing platform with the ability to verify the accuracy of any non-compliance vulnerability report prior to any distribution of the vulnerability report to the at least one provider and/or any entity associated with the device within the at least one the ecosystem platform.

14. The system of claim 9, wherein the security profile created includes at least one pledge and at least one identification level related to the at least one pledge for the at least one device and its intended function.

15. The system of claim 14, wherein the at least one pledge comprises a rule related to creating unique security credential for access to the at least one device.

16. The system of claim 14, wherein the at least one pledge comprises a rule related to having a secured interface between the hardware and software associated with the at least one device.

17. The system of claim 14, wherein the at least one pledge security profile comprises a rule related to having a secured interface between the hardware and software associated with the at least one device.

18. A method for dynamic testing, the method comprising:
connecting at least one testing module to at least one device ecosystem platform associated with at least one device, wherein the at least one testing module further comprises at least one opportunity testing module;
performing opportunity testing to identify any vulnerability associated with the at least one device;
generating a vulnerability report related to the non-compliance of the at least one device;
communicating the vulnerability to the at least one device, the opportunity testing module further configured to keep any identification information related to any opportunity tester confidential within the vulnerability report; and
automatically sharing the vulnerability report with an upstream supplier associated with the at least one device if the vulnerability is not addressed and remedied by the at least one device within a certain pre-determined time period.

19. The method of claim 18, wherein the timing comprises the number of days available to the at least one device to address and remedy the violation based on the vulnerability report before the vulnerability report is automatically elevated and shared with the at least one provider and/or an upstream supplier associated with the at least one provider.

20. The method of claim 18, wherein the vulnerability report includes at least one identification information for the at least one device and/or the at least one provider but do not include any identification information related to any opportunity testing module.

* * * * *